United States Patent Office 2,764,321
Patented Sept. 25, 1956

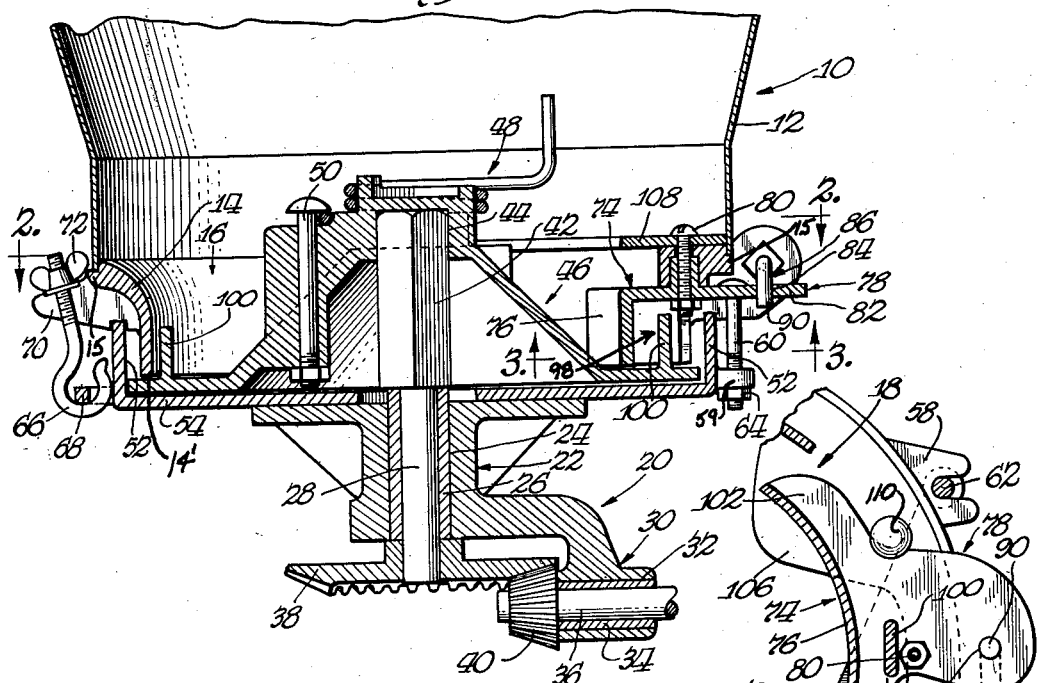

2,764,321

FERTILIZER DISTRIBUTOR WITH ADJUSTABLE GATE CONTROL AND FORCE FEED MEANS TO INSURE DISCHARGE OF FERTILIZER

Rionold E. Gerdes, Henry G. Kromminga, and Paul T. Rewerts, Aplington, Iowa

Application December 21, 1953, Serial No. 399,525

8 Claims. (Cl. 222—242)

This invention relates to an improvement in fertilizer distributors and more particularly to the inclusion of a force feed apparatus in a fertilizer distributor.

In existing fertilizer distributors of the type to which this invention is applicable there is provided a hopper, or container, for storage of an amount of fertilizer, which hopper is provided with a lateral discharge port through which fertilizer may be discharged. In the hopper there is provided a revolving feed member which is generally in the form of a horizontally disposed plate positioned below the lateral discharge opening. The revolving feed member may have attached thereto an agitator for agitating the fertilizer, but, for discharging the fertilizer through the lateral discharge port, reliance is placed solely upon the ordinary frictional engagement between the revolving feed member and the fertilizer stored in the hopper. Furthermore, to control the discharge of fertilizer from the hopper, there is provided a control gate which may be pivoted inwardly into the hopper. This gate is pivoted at one end thereof adjacent the hopper wall, and the other end of the gate is movable toward and away from the hopper wall to vary the size of the discharge opening through which the fertilizer passes, and in this manner the rate of discharge of the fertilizer is controlled.

The above described existing fertilizer distributor is unsatisfactory in the respect that if the fertilizer being used gets lumpy and a lump gets caught in the discharge opening, the flow of fertilizer is stopped because the friction feed of the rotating member is insufficient to break the block of the discharge opening. If the blocking of the discharge opening of the fertilizer distributor takes place when the farmer is fertilizing a row in his field, it may be that all or a portion of the entire row will fail to receive any fertilizer and this is, of course, detrimental to the end result being sought by the farmer. Because of this possibility of blocking of the discharge opening, the farmer must frequently check the discharge opening of the fertilizer distributor to determine whether or not it is clogged. If the farmer checks at the end of every row he fertilizes, the time expended is great and the potential efficient use of the fertilizer distributor is greatly reduced by time delays involved in checking the distributor and in unblocking the discharge opening in case it happens to be blocked.

Thus, one object of this invention is to provide a fertilizer distributor having novel positive feeding means and anti-blocking features which prevents possible clogging or blocking of the discharge opening of the hopper by lumps of fertilizer being discharged.

Another object of this invention is to provide an improved discharge gate for use with a fertilizer distributor, and for use with a positive feeding means which prevents blocking of the discharge opening of the fertilizer distributor.

A further object of this invention is to provide an improved discharge gate having the above set forth novel and improved features and which gate provides novel means for adjustment thereof for varying the size of the discharge opening of the fertilizer distributor.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a fragmentary view showing the lower portion of the fertilizer distributor which incorporates therein our invention;

Figure 2 is a cross-section view taken substantially on line 2—2 of Figure 1; and Figure 3 is a fragmentary cross-section view taken substantially on line 3—3 of Figure 1.

Referring now to the drawings, there is shown in Figure 1 a hopper generally indicated at 10 for carrying fertilizer therein. The hopper includes upright side walls 12, which may be formed of sheet metal or the like, and also includes a ring-like casting 14 which, in part, is merely the lowermost extension of the side walls 12. The ring 14 and the side walls 12 may be secured together in any appropriate manner, there being provided, for example, a plurality of lugs 15, integral with ring 14, for engaging and supporting the side walls 12. The hopper 10 has an aperture 16 in the bottom thereof, said aperture being defined by the inner periphery of ring 14. The ring 14 has a lateral aperture 18 which serves as the discharge port through which the fertilizer is discharged from the fertilizer distributor.

The fertilizer distributor is an attachment-type device and may be secured to the power take-off of a tractor or other farm vehicle in any appropriate manner. As shown herein, the fertilizer distributor includes a mounting bracket generally indicated at 20 for supporting the hopper 10 thereon. The mounting bracket 20 includes a first portion 22 having a vertical bore 24 therethrough, and a sleeve bearing 26 in said vertical bore, within which bearing 26 may be journalled a driven shaft 28. The bracket includes a second portion 30 having a horizontal bore 32 therethrough within which bore is positioned a sleeve bearing 34 for journalling therein a drive shaft 36. The shafts 28 and 36 are drivingly interconnected by bevel gears 38 and 40 which are carried respectively by shafts 28 and 36.

The shaft 28 is provided with a shank portion 42 of non-circular cross section, herein shown of square cross section, which shank portion 42 is adapted to be keyed to a socket 44 in the underside of a revolvable plate 46. The non-circular shank portion 42 and socket 44 provides for a driving interconnection between shaft 28 and rotatable plate 46.

The revolving plate 46 is positioned within the hopper across the aperture 16 of the hopper 10, and below the discharge port 18. In the pre-existing fertilizer distributor, the fertilizer in the hopper 10 bears on the revolving plate 46 and as plate 46 revolves the frictional engagement between plate 46 and the fertilizer causes the fertilizer to be fed through the discharge port 18. To prevent bridging of the fertilizer within the hopper 10 and to also provide for agitation within the hopper, there is provided an agitator 48 of the type shown which is attached to the revolving plate 46 by any appropriate means, such as by bolt 50, and which agitator revolves with the plate 46.

The mounting bracket 20 also includes a dished portion defining an upwardly extending cylindrical flange 52 and a transverse wall 54 disposed generally horizontally. The upper edge of flange 52 is adapted to engage the underside of portions of ring 14 thereby providing a support for ring 14 and for the hopper 10 mounted thereon.

The engagement of the upper edge of flange 52 with ring 14 also serves to space the lower edge 14' of ring 14 from the transverse wall 54. This permits positioning of a portion of plate 46 between the lower edge 14' of ring 14 and the transverse wall 54, as shown in Figure 1, to permit rotation of plate 46.

Any appropriate means may be provided for securing the hopper 10 and ring 14 to the mounting bracket 20. The particular means shown include laterally extending bifurcated flanges 56 and 58 carried by the ring 14 which may be aligned with corresponding laterally extending bifurcated flanges 59 carried by the cylindrical flange 52. Bolts 60 and 62 are fitted into the bifurcated flanges 56 and 58 and into the corresponding flanges carried by flange 52. And nuts 64 threaded on bolts 60 and 62 serve to clamp the ring 14 and the mounting bracket 20 together on one side. There is also provided a hook clamp consisting of a hook bolt 66 pivotally carried by a lateral flange 68 on cylindrical flange 52 and adapted to be swung into the recess of bifurcated flange 70 carried by ring 14. An adjustable nut 72 threaded to hook bolt 66 is adapted to overlie and engage flange 70 to cause clamping together of the ring 14 and the mounting bracket 20.

Thus far what has been described is found in pre-existing fertilizer distributors. There will be described hereinafter the modifications and improvements of the existing fertilizer distributors, by means of which superior results of operation are attained.

In the improved fertilizer distributor, there is provided with the apparatus thus far described, a control gate or gate member 74. The gate member 74 includes an upright gate wall 76 and a horizontal flange 78 secured to the gate wall 76. The gate member 74 is shown as a single member with the gate wall 76 formed integral with the horizontal flange 78. The upright gate wall 76 is generally arcuate and of such radius of curvature that it may be positioned substantially concentrically with the arcuate walls of the hopper 10. The arcuate length of gate wall 76 is greater than the arcuate length of the lateral discharge port 18. And the gate wall 76 is so positioned that portions thereof are located radially opposite portions of the hopper wall adjacent the arcuate ends of the discharge port 18.

The horizontal flange 78 has a portion thereof which is of lesser dimension than the length of the discharge port 18, whereby the gate member 74 may be mounted on the hopper 10 with said horizontal flange 78 extending through the discharge port 18, as can be seen in the figures. A portion of the flange 78 is pivotally secured, by means of a bolt 80, to a portion of ring 14 at a point spaced from the gate wall 76. The mounting arrangement of the gate member is such that the gate member 74 is pivotable about the axis of the bolt 80 so that portions of the gate wall 76 may be swung toward and away from the walls of the hopper 10.

Another portion of the horizontal flange 78 is referred to as a control portion 82 and is spaced from the gate wall 76 on generally opposite sides of the bolt 80 upon which the gate member 74 is pivotally mounted. This control portion 82 has an aperture 84 therethrough to provide a connection means for a control link 86. The control link 86 is for the purpose of adjusting the spacing of the gate wall 76 from the walls of the hopper. And means are provided for locking the control link, and thereby the gate wall 76 in selected positions. As shown, there is a flange 88 extending from the hopper ring 14. The control link includes a short leg 90 extending through aperture 84, and a longer leg 92. The leg 92 of link 86 is threaded and extends through an aperture in flange 88. Nuts 94 and 96 threaded onto link 86 and positioned on opposite sides of flange 88 cooperate with flange 88 and provide means for adjusting the position of link 86 and for maintaining link 86 in selected positions.

In the improved fertilizer distributor, the gate wall 76 is spaced, at all times, from the interior perimeter of ring 14, so as to define therebetween a vertical, arcuate, channel generally indicated at 98. There is mounted on revolving plate 46 a plurality of upright lugs 100 which are so positioned as to pass through the channel 98 as the plate 46 is revolved, the direction of rotation being designated by arrows 101. In this way, if any lumps of fertilizer become wedged between the gate wall 76 and the wall of the hopper, the lugs 100, upon passing through channel 98, serve to break up the lumps and in that way feeding or distribution of the fertilizer is continuously maintained. The upstanding lugs 100 also serve as positive means for forcing fertilizer through the discharge port 18. The parts are so arranged and designed that when any portion of the channel 98 is of a minimum width the lugs 100 are still adapted to pass therethrough without interference with the other parts of the distributor, and thus there is no possibility of jamming of the parts of the fertilizer distributor.

In order to limit the pivoting of the gate wall 76 toward the walls of the hopper, stop means are interposed between the hopper and the gate. In particular, these stop means consist of the horizontal flange 78 being provided with enlarged portions 102 and 104 which are adapted to engage the hopper wall as the gate member 74 is pivoted. The enlarged portion 102 limits the pivoting of the gate member 74 in one direction while the enlarged portion 104 limits the pivoting of the gate member 74 in the opposite direction.

As was explained earlier, in prior fertilizer distributors the control gate is pivoted adjacent the hopper wall, while in the improved control gate of this invention the gate wall thereof is positioned, at all times, within the hopper in spaced relation to the hopper walls. Now since the fertilizer is stored in the hopper above the control gate, there may be a tendency for fertilizer to leak past the discharge gate and through the discharge port.

Considering the length of channel 98 formed between the gate wall and the hopper wall, the channel can be considered to have a leading end and a trailing end, which ends are so identified in relation to the direction of movement of the lugs 100 through the channel 98. The lugs 100 enter channel 98 at the leading end and leave the channel 98 at the trailing end thereof.

The fertilizer in the hopper may tend to leak past the control gate both at the leading and trailing ends of the channel 98. The leakage through the leading end is controlled by the flange 106 formed integral with ring 14 and which overlies the region wherein the leading end of the channel 98 is located. In the improved fertilizer distributor, since there is now an open trailing end of channel 98, means must be provided to prevent leakage of fertilizer into the channel 98 through the trailing end thereof.

To prevent such leakage there is provided a plate segment 108 in the shape of a chordal segment of a circle, which plate segment 108 is positioned within the hopper 10 and overlies the trailing end of the channel 98. The plate segment 108 is secured to ring 14 by means of the same bolt 80 upon which the gate member 74 is pivoted. The plate segment 108 is spaced above a portion of rotating plate 46 in parallel relation thereto and defines therebetween a horizontal channel within which the gate member 74 is generally positioned and within which horizontal channel the gate member may be selectively swung as the spacing between the gate wall 76 and the hopper wall is varied.

In order to provide sufficient support for the gate member 74 on ring 14, in addition to the bolt 80 upon which said gate member 74 is pivoted, there is provided a large-head bolt 110 secured to ring 14 with the head of said bolt 110 spaced from the ring so as to define a slot, or channel, between ring 14 and the head of bolt 110 of slightly greater dimension than the thickness of the horizontal flange 78 of gate member 74. Positioned in the slot or channel is a portion of the horizontal flange 78 of the gate member 74. The size of the head of the bolt 110 and the shape of the cooperating portion of horizontal flange 78 are so selected that for all positions of said gate member 74, a portion of said horizontal flange 78 is positioned between the head of bolt 110 and the ring 14.

Thus, it can be seen that there has been provided an improved discharge gate for a fertilizer distributor in combination with novel positive feeding means and anti-blocking features which prevent possible clogging or blocking of the discharge opening of the fertilizer distributor by lumps of fertilizer being discharged.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A fertilizer distributor comprising, in combination, a hopper having upright side walls and an aperture at the bottom thereof, a revolving plate positioned within said aperture and substantially closing the bottom of the hopper, a lateral discharge port in the hopper side wall positioned above said rotatable plate, a gate member supported by said hopper and providing an upright gate wall which is positioned within the hopper in spaced relation with the upright wall of the hopper and opposite the portion of the wall having said lateral discharge port therein, said gate wall and the hopper wall defining a channel therebetween, lugs mounted on said revolving plate and extending upwardly therefrom positioned to pass through said channel as said plate is revolved, and means operatively associated with said gate member for adjustably positioning said gate member on said hopper so as to provide for varying the width of said channel between the gate wall and the hopper wall, while at all times maintaining the identity of said channel through which said lugs pass.

2. A fertilizer distributor comprising, in combination, a hopper having upright cylindrical side walls and an aperture at the bottom thereof, a revolving plate positioned within said aperture and substantially closing the bottom of the hopper, a lateral discharge port in the hopper side wall positioned above said rotatable plate, a gate member supported by said hopper and providing an upright arcuate gate wall which is positioned within the hopper in spaced, substantially concentric, relation with the upright cylindrical wall of the hopper and opposite the portion of the wall having said lateral discharge port therein, said gate wall being of greater arcuate length than the length of the lateral discharge port, said gate wall and the hopper wall defining an arcuate channel therebetween, lugs on said revolving plate extending upwardly therefrom positioned to pass through said channel as said plate is revolved, and means operatively associated with said gate member for adjustably positioning said gate member on said hopper so as to provide for varying the width of said channel between the gate wall and the hopper wall.

3. A fertilizer distributor comprising, in combination, a hopper having upright side walls and an aperture at the bottom thereof, a revolving plate positioned within said aperture and substantially closing the bottom of the hopper, a lateral discharge port in the hopper side wall positioned above said rotatable plate, a gate member supported by said hopper and providing an upright gate wall which is positioned within the hopper in spaced relation with the upright wall of the hopper and opposite the portion of the wall having said lateral discharge port therein, said gate wall and the hopper wall defining a channel therebetween, lugs mounted on said revolving plate and extending upwardly therefrom positioned to pass through said channel as said plate is revolved, means operatively associated with said gate member for adjustably positioning said gate member on said hopper so as to vary the spacing between the gate wall and the hopper wall, and stop means interposed between said hopper and said gate member cooperating with said gate member to limit the movement of said gate wall toward the hopper wall, so as to preserve at all times the identity of said channel through which said lugs on the rotating plate pass.

4. A fertilizer distributor comprising, in combination, a hopper having upright side walls and an aperture at the bottom thereof, a revolving plate positioned within said aperture and substantially closing the bottom of the hopper, a lateral discharge port in the hopper side wall positioned above said rotatable plate, a gate member supported by said hopper and providing an upright gate wall which is positioned within the hopper in spaced relation with the upright wall of the hopper and opposite the portion of the wall having said lateral discharge port therein, said gate wall and the hopper wall defining a vertical channel therebetween, lugs mounted on said revolving plate and extending upwardly therefrom positioned to pass through said channel as said plate is revolved, means operatively associated with said gate member for adjustably positioning said gate member on said hopper so as to vary the spacing between the gate wall and the hopper wall, stop means interposed between said hopper and said gate member cooperating with said gate member to limit the movement of said gate wall toward the hopper wall, so as to preserve at all times the identity of said channel through which said lugs on the rotating plate pass, a plate segment secured to the hopper and positioned therein, and spaced above the rotating plate to define between said plate segment and said revolving plate a horizontal channel within which said gate is positioned and within which said gate may be moved as the spacing between the gate wall and the hopper wall is varied, and said plate segment overlying the trailing end of said vertical channel to control leakage of fertilizer therethrough.

5. A fertilizer distributor comprising, in combination, a hopper having upright side walls and an aperture at the bottom thereof, a revolving plate positioned within said aperture and substantially closing the bottom of the hopper, a lateral discharge port in the hopper side wall positioned above said rotatable plate, a gate member supported by said hopper and providing an upright gate wall which is positioned within the hopper in spaced relation with the upright wall of the hopper and opposite the portion of the wall having said lateral discharge port therein, said gate wall and the hopper wall defining a channel therebetween, lugs mounted on said revolving plate and extending upwardly therefrom positioned to pass through said channel as said plate is revolved, means operatively associated with said gate member for adjustably positioning said gate member on said hopper so as to vary the spacing between the gate wall and the hopper wall, and stop means comprising flanges carried by said gate member adapted to engage the hopper walls for limiting the movement of said gate wall toward the hopper wall to preserve at all times the identity of said channel through which said lugs on the rotating plate pass.

6. A discharge control gate for use with a fertilizer distributor which includes a hopper having upright side walls and a lateral discharge port in said hopper side walls, said control gate comprising an upright gate wall and a horizontal flange secured thereto, said gate wall being of greater length than the length of the lateral discharge port in the hopper, a portion of the horizontal flange being of lesser dimension than the length of said discharge port, whereby the gate may be mounted on said hopper with said horizontal flange extending through said discharge port and with said gate wall positioned within said hopper with all portions of said gate wall spaced from the hopper wall, said horizontal flange being adapted to be pivotally mounted on said hopper at a point on said flange spaced from said upright gate wall, said horizontal flange also defining a control portion thereof which is spaced from said gate wall on opposite sides of said point of the flange which is adapted to be pivoted to said hopper, said control portion adapted to be manipulated to cause pivoting of said gate member and for causing relative movement of said gate wall toward and away from said hopper wall, and enlarged portions on said horizontal flange adapted to be positioned inwardly of said hopper wall and adapted to engage said hopper wall to limit the pivoting of said gate wall toward and away from said hopper wall.

7. A fertilizer distributor comprising, in combination, a hopper having upright side walls and an aperture at the bottom thereof, a revolving plate positioned within said aperture and substantially closing the bottom of the hopper, a lateral discharge port in the side wall of the hopper positioned above said rotatable plate, a gate member supported by said hopper and providing an upright gate wall which is positioned within the hopper in spaced relation with the upright wall of the hopper and opposite the portion of the hopper wall having said lateral discharge port therein, said gate wall being of greater length than the length of the lateral discharge port in the hopper wall, said gate member including a horizontal flange secured to the gate wall and having a portion thereof of lesser dimension than the length of said discharge port, whereby the gate may be mounted on said hopper with said horizontal flange extending through said discharge port, said horizontal flange being secured to said hopper so that the gate wall is positioned within said hopper with all portions of the gate wall spaced from the hopper wall to define a channel therebetween, and lugs mounted on said revolving plate and extending upwardly therefrom positioned to pass through said channel as said plate is revolved.

8. A fertilizer distributor comprising, in combination, a hopper having upright side walls and an aperture at the bottom thereof, a revolving plate positioned within said aperture and substantially closing the bottom of the hopper, a lateral discharge port in the side wall of the hopper positioned above said rotatable plate, a gate member supported by said hopper and providing an upright gate wall which is positioned within the hopper in spaced relation with the upright wall of the hopper and opposite the portion of the hopper wall having said lateral discharge port therein, said gate wall and the hopper wall defining a channel therebetween, said gate wall being of greater length than the length of the lateral discharge port in the hopper wall, said gate member including a horizontal flange secured to the gate wall and having a portion thereof of lesser dimension than the length of said discharge port, whereby the gate may be mounted on said hopper with said horizontal flange extending through said discharge port, said horizontal flange being pivotally secured to said hopper at a point on said flange spaced from said upright gate wall, said flange defining a control portion thereof spaced from said gate wall on opposite sides of said point of said flange which is pivotally secured to said hopper, said control portion adapted to be manipulated to cause pivoting of said gate member and to cause relative movement of portions of said gate wall toward and away from said hopper wall, means operatively associated with said gate member for varying the spacing between the gate wall and the hopper wall, and enlarged portions on said horizontal flange positioned inwardly of said hopper wall and adapted to engage said hopper wall to limit the pivoting of said gate wall toward and away from said hopper wall.

References Cited in the file of this patent

UNITED STATES PATENTS

| | | |
|---|---|---|
| 570,490 | Mead | Nov. 3, 1896 |
| 1,016,766 | Packham | Feb. 6, 1912 |
| 1,210,636 | Garst | Jan. 2, 1917 |
| 2,017,759 | Kriegbaum et al. | Oct. 15, 1935 |
| 2,369,508 | White | Feb. 13, 1945 |